(12) United States Patent
Ichikawa et al.

(10) Patent No.: US 6,426,569 B1
(45) Date of Patent: Jul. 30, 2002

(54) ADAPTIVE VARIABLE FREQUENCY PWM LAMP-USING SYSTEM

(75) Inventors: Shigehisa Ichikawa, Farmington Hills, MI (US); Kang Li, Windsor (CA)

(73) Assignee: Yazaki North America

( * ) Notice: Subject to any disclaimer, the term of this patent is extended or adjusted under 35 U.S.C. 154(b) by 82 days.

(21) Appl. No.: 09/616,011

(22) Filed: Jul. 13, 2000

(51) Int. Cl.[7] .................................................. H02G 3/00
(52) U.S. Cl. ...................... 307/10.1; 307/9.1; 307/10.8; 32/132
(58) Field of Search ................................ 307/10.1, 9.1, 307/10.8; 323/284, 282; 327/403; 320/127, 128, 136, 140

(56) References Cited

U.S. PATENT DOCUMENTS

| | | | |
|---|---|---|---|
| 4,841,198 A | | 6/1989 | Wilhelm |
| 5,053,677 A | | 10/1991 | Sanner et al. |
| 5,334,926 A | * | 8/1994 | Imaizumi ..................... 320/15 |
| 5,548,206 A | * | 8/1996 | Soo ............................. 323/284 |
| 5,691,576 A | | 11/1997 | Minks |
| 5,731,731 A | * | 3/1998 | Wilcox et al. .............. 327/403 |
| 5,834,854 A | | 11/1998 | Williams |
| 5,982,161 A | * | 11/1999 | Nguyen et al. ............ 323/284 |
| 2001/0035685 A1 | * | 11/2001 | Tamai et al. ............... 307/10.1 |

OTHER PUBLICATIONS

Energy Science and Technology (DOE), "Challenged to a Dual–European car industry leads promotion of 42V/14V Dual Voltage System for Cars to Allow to Meet Increasing Demands for Electricity While Meeting Increased Fuel Economy Goals." *Engineer No. 1203,* Mar. 12, 1998, Paeg 31.

* cited by examiner

*Primary Examiner*—Brian Sircus
*Assistant Examiner*—Robert L. Deberadinis
(74) *Attorney, Agent, or Firm*—Young & Basile

(57) ABSTRACT

A variable frequency pulse width modulated apparatus and method supplies variable frequency and variable duty cycle power to a load, particularly an electric load of a motor vehicle, and preferably to a filament-type lamp such as a headlight. Which one of the two frequencies are selected is based on a monitored battery parameter, such as a comparison between the current supplied to the battery by an alternator and the current drawn from the battery by a load, with a higher one of the two frequencies being selected when the input current exceeds the output current and the lower frequency being selected when the battery input current is less than the output current. The duty cycle is variably selectable with either first or second pulse width modulated frequency.

5 Claims, 5 Drawing Sheets

ADAPTIVE VARIABLE FREQUENCY PWM LAMP-USING SYSTEM

BACKGROUND

The present invention is in the field of direct current vehicle lighting systems, and more particularly, 42 volt systems.

Automotive vehicles increasingly require greater direct current (DC) electrical power. Vehicle electrical systems must handle ever greater loads, while at the same time meeting industry demands for lighter vehicles. At the same time, more wire is needed to supply all of the electricity-using components on the vehicle. Weight considerations mandate smaller gauge wire. Line loss considerations with low voltage (12V) power favor heavier gauge wire.

One known approach for supplying greater power to a vehicle electrical system without increasing wire thickness is to initially supply power at a much higher voltage, for example 42V. Theoretically, with the same current demand, the power from a 42V system is three times that of a 12V (actually 14V) system.

However, automotive headlights, brake lights, parking lights and the like prefer 12V power due to the unique resistance characteristics of the incandescent lamp filaments. The resistance of a filament at 42V is nine times higher than its resistance at 12V, or the square of the increase in power. This means that to operate properly, 42V lamps should have longer and/or thinner filaments than 12V lamps. The problem is that long, thin filaments are brittle and their optical quality is generally unfavorable.

One prior art approach to running 12V vehicle appliances such as lamp bulbs at 12V from a 42V power supply has been to use what is commonly referred to as a "centralized architecture". An exemplary centralized 42V architecture system is shown in FIG. 1. The vehicle alternator 10 keeps a 42V battery 11 charged. Battery 11 supplies 42V current to a first 42V line 13 and a DC/DC converter 15 which converts the 42V current to 12V and recharges a 12V battery 17. 12V lamp-using lights are then supplied with 12V current from battery 17 via lines 17a–17d. 12V filament-type bulbs are accordingly supplied with a steady flow of 12V current, for example at headlamps 18a, 18b and tail lights 18c, 18d.

The problems with 42V/12V hybrid systems such as that shown in FIG. 1 include the requirement of two separate batteries in the vehicle, which greatly increases weight and cost. Additionally, DC/DC converters of the type illustrated at 15 are expensive, and can add considerable cost to a vehicle.

A less expensive, but still unsatisfactory, alternative 42V architecture is shown in FIG. 2. Alternator 10 still supplies a 42V battery 11 and keeps it charged. Battery 11 can supply straight 42V current along line 13 to 42V-using components. Instead of a DC/DC converter and separate 12V battery, however, distributed 12V lines to filament-type bulb using components such as head lamps and tail lights are each supplied with their own pulse width modulation (PWM) generators 16. PWM generators 16 comprise constant frequency, PWM generators of a commercially available type and are generally much less expensive than a DC/DC converter. The PWM generators give a pulsed, constant frequency output at 42V per pulse which, when averaged over time constitutes a roughly 12V supply to each 12V-using component. The manner in which pulse width modulation is used to couple and decouple the battery voltage to devices such as a lamp to provide an average DC voltage less than the actual battery voltage is generally known. See for example, U.S. Pat. No. 4,841,198 to Wilhelm. Devices for carrying out pulse width modulation are also known and commercially available, as will be recognized by those skilled in the art.

Despite the advantages of pulse width modulation in a distributed 42V architecture such as that shown in FIG. 2, pulse width modulated current creates problems with standard filament-type automotive lamp bulbs. PWM current operated at a low frequency results in higher efficiency at the lamp bulb (and resulting relatively brighter light), but a short life expectancy. High frequency PWM current extends the life of the lamp filament, but results in a low efficiency (relatively dim) light.

SUMMARY

The present invention is an adaptive, variable frequency, pulse width modulated apparatus and method for supplying variable frequency and variable duty cycle power from a higher voltage source to a lower voltage electric load such as one or more lamps.

According to one aspect of the invention, an apparatus is provided for controlling the application of DC power to an electrical load in an automotive electrical system comprising a vehicle battery having a substantially higher voltage than is desired for direct application to the load. The system further comprises a pulse width modulation (PWM) circuit connected between the battery and the load to lower the applied voltage from, for example, 42V to, for example, 12V–14V, through appropriate duty cycle adjustment. In accordance with the apparatus aspect of the invention, further means are provided monitoring the condition of the battery and producing an output signal having a value with an indication of the condition of the battery; i.e., either good or bad. The circuit further comprises means for connecting the output signal of the monitor to the pulse width modulation circuit to vary the operating frequency thereof according to the value of the output signal.

In general, a higher operated rating frequency is selected when the battery condition is good and a lower operating frequency is selected when the battery condition is less than good.

According to a second, method aspect of the invention, a method of energizing an electrical load in a motor vehicle comprises the steps of supplying electrical power from a battery to a load through a pulse width modulatable switch, operating the switch at a duty cycle which decreases the battery voltage to a desired applied voltage, monitoring battery condition, and varying the frequency of the switch modulation based on the monitored battery condition so as to select a lower frequency of pulse width modulation whenever battery condition indicates the need to conserve battery power.

The apparatus and the method of the present invention utilize pulse width modulation to couple and decouple the battery voltage to vehicle electrical devices, such as lamps, to provide an average DC voltage, such as 12V, from the actual battery voltage of 42V. The apparatus and method automatically switch the pulse width modulator between high frequency and low frequency modes of operation corresponding respectively to an ordinary working mode and an energy saving mode depending upon the condition of the battery input and output current levels. This enables the present invention to extend a vehicle lamp's life through use of the ordinary higher frequency mode as much as possible during normal operation of the battery, or to extend the battery life by use of the energy saving lower frequency during certain critical operating conditions when the load power demand or load current drawn from the battery exceeds the current supplied to the battery. In this later instance, a lower frequency is supplied to the pulse width modulator to reduce the load on the battery.

BRIEF DESCRIPTION OF THE DRAWING

The various features, advantages and other uses of the present invention will become more apparent by referring to the following detailed description and drawings in which.

DESCRIPTION OF THE PREFERRED EMBODIMENT

Figure 1:
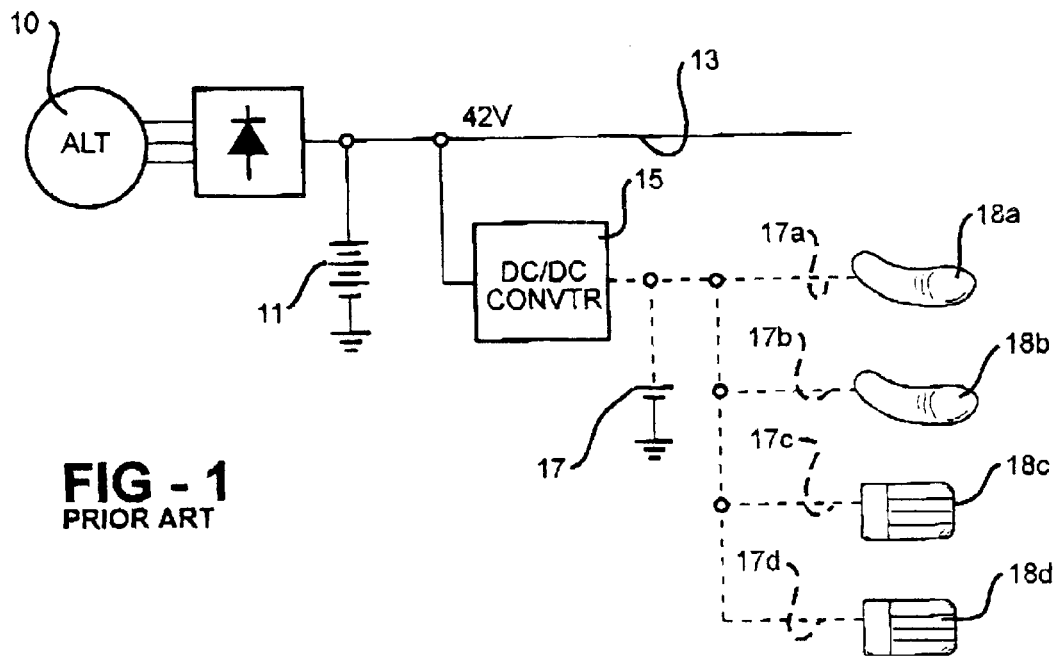
FIG. 1 is a prior art circuit for operating 12V vehicle appliances at 12V from a 42 V power supply.
Figure 2:
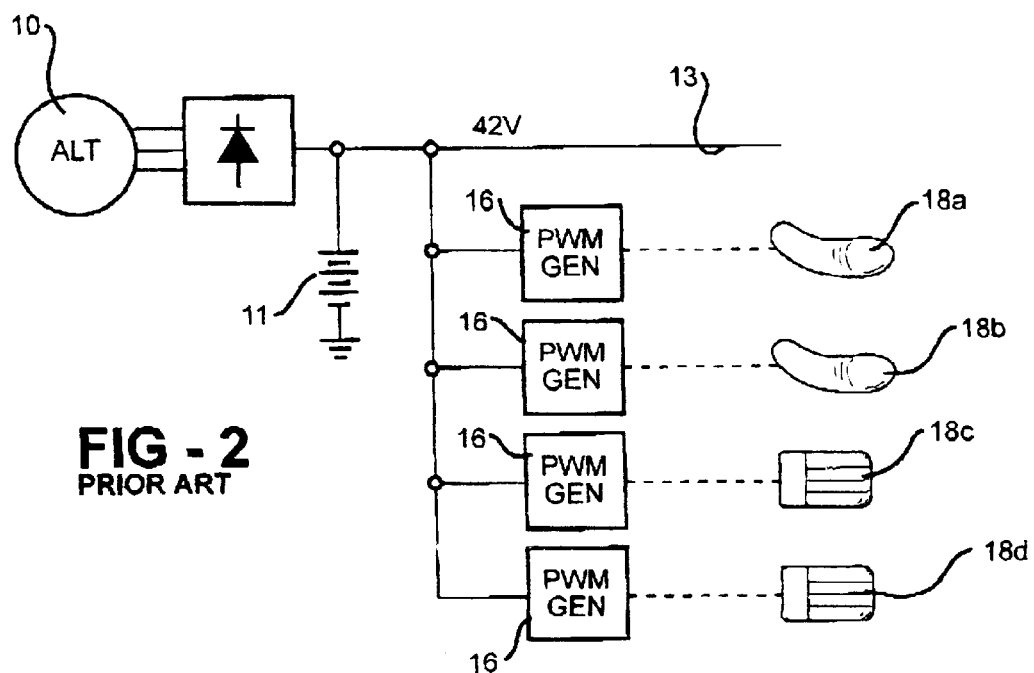
FIG. 2 is a prior art circuit with an alternate 42V circuit used to supply 12V power to 12V vehicle appliances.
Figure 3A:
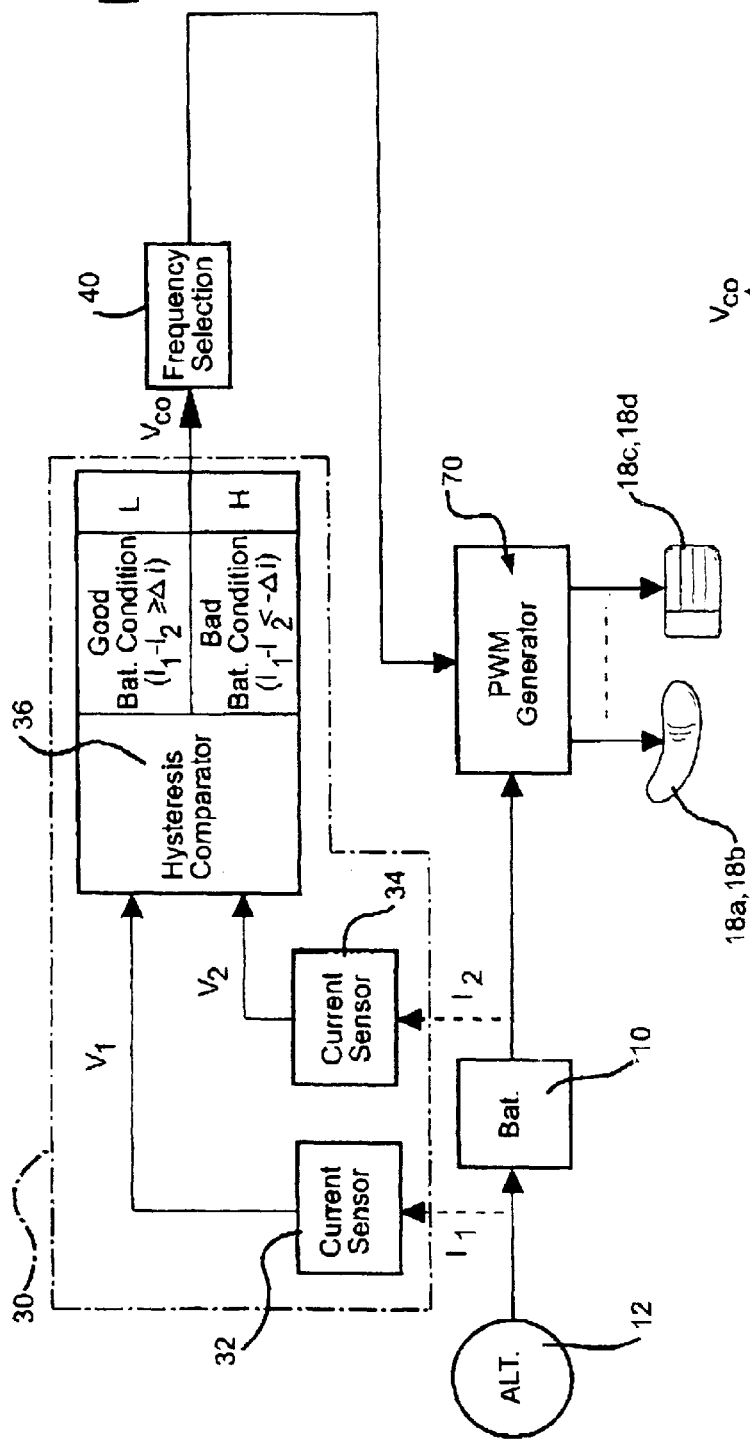
FIG. 3A is a block diagram of an adaptive variable frequency PWM lamp control circuit according to the present invention.
Figure 3B:
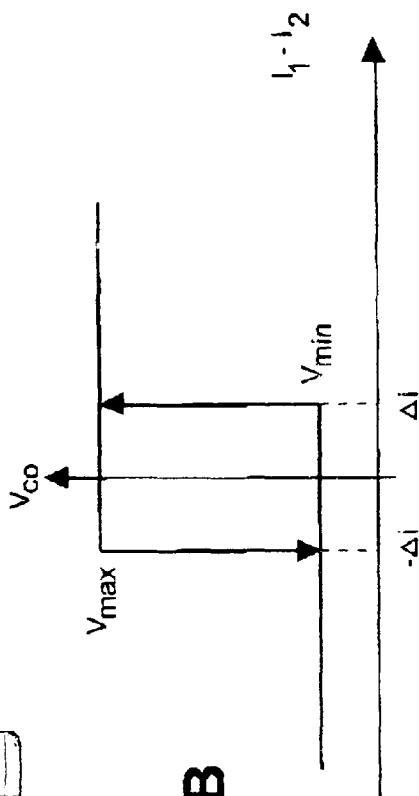
FIG. 3B is a graph depicting the input hysteresis of the voltage comparator shown in FIG. 3A
Figure 4:
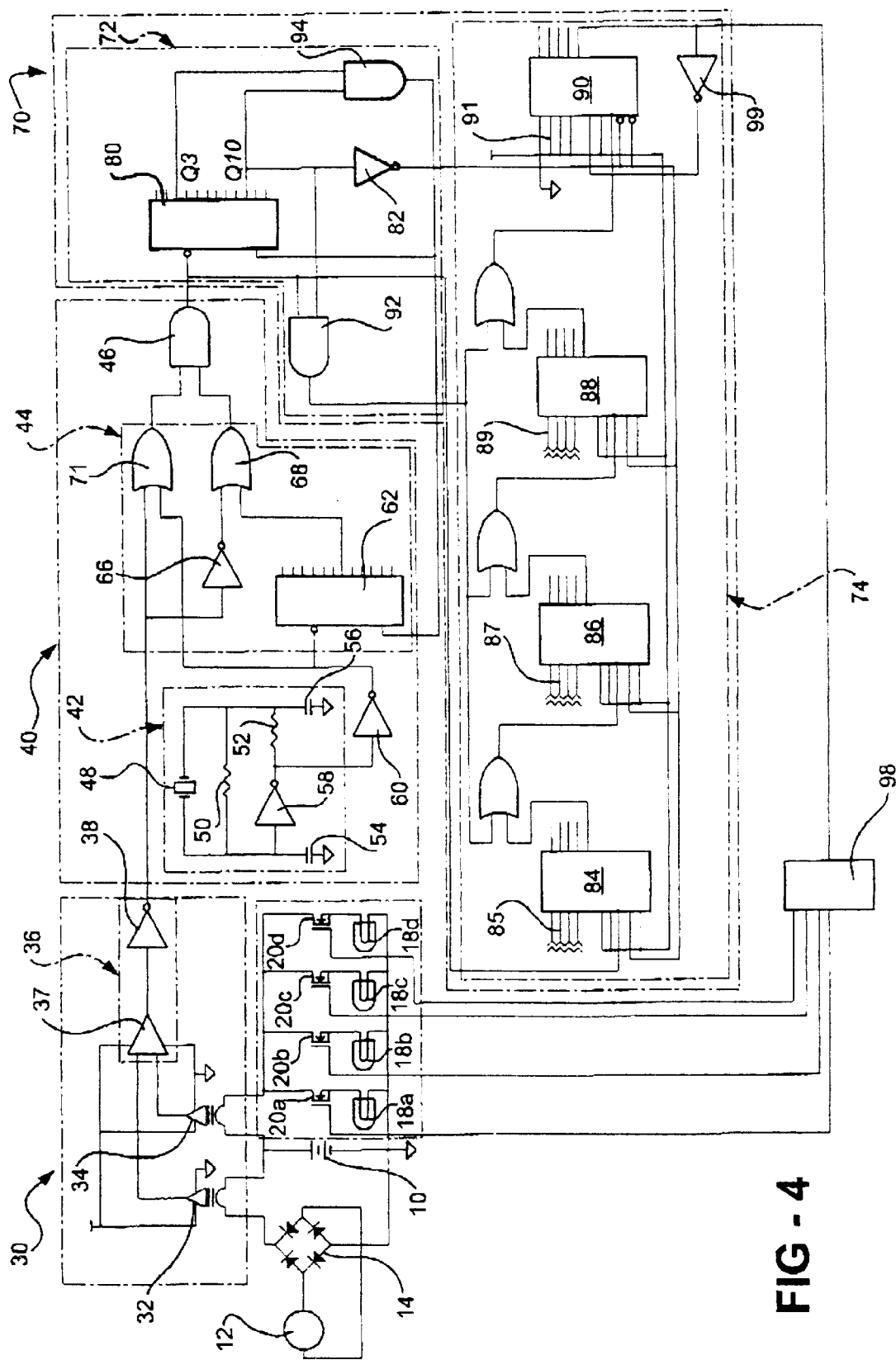
FIG. 4 is a schematic diagram of the circuit shown in FIG. 3A according to one aspect of the present invention.

Referring now to the drawing, and to FIGS. 3A, 3B and 4, there is depicted an adaptive, variable frequency, pulse width modulated (PWM) circuit for driving a load, such as a 12V vehicle lamp, from a 36/42V battery power supply.

FIG. 3A depicts block system diagram of the present invention which includes a battery 10, preferably a 36V automotive battery, which outputs voltage typically at 42V D.C. An alternator 12 is coupled to the battery 10. Not shown in FIG. 3A are the typical ignition switch, and load control switches, such as lamp on/off switches used to activate the entire electrical system and/or each individual lamp.

In this embodiment, a plurality of loads 18a, 18b, 18c, and 18d, by example only, are shown as being driven by the inventive apparatus. It will be understood that any number of individual loads, as well as loads of different types, not necessarily lamps, may be driven by the apparatus of the present invention. However, the invention as illustrated herein is particularly suited for running filament-type vehicle lamps from higher-voltage battery sources in optimized high/low efficiency modes depending on battery condition and load.

As shown in FIG. 4, the output of the alternator 12 is rectified by a bridge rectifier 14, the outputs of which are connected across the loads 18a, 18b, 18c, and 18d. The battery 10 is also connected in parallel with the output of the rectifier 14.

As also shown in FIG. 4, a switch, such as a mosfet switch 20a, 20b, 20c, and 20d, is connected in series with each of the loads 18a, 18b, 18c, and 18d, respectively.

The output of alternator 12 through the rectifier 14 and the output of the battery 10 supply power to a battery condition monitoring circuit 30. The battery condition monitoring circuit 30 is capable of monitoring at least one and possibly two or more battery conditions, such as battery current, battery voltage and battery temperature, and generating an output indicative of the level or magnitude of the measured battery condition or parameter. For example, the monitored battery condition can be the difference between the input current supplied to the battery by the alternator and the battery output current drawn by the loads 18a–18d. Alternately, or in combination with the input and output current difference, the monitored battery condition can be the output battery voltage compared to a reference. Yet another battery parameter which can be monitored according to the present invention is the battery temperature. The battery temperature can also be compared to a reference to provide a good or bad battery condition characterization as described hereafter.

It will be understood that the following example of the use of the difference between the battery input current and the battery output current as the monitored battery condition or parameter is only by way of example as other battery conditions may be monitored and the results thereof used to characterize the present battery condition as good or bad.

In the present invention, the battery condition monitoring circuit is formed of two current sensors 32 and 34, and a hysteresis comparator 36 formed of an operational amplifier 37 and a Schmitt trigger inverter 38. The first current sensor 32 measures the current $I_1$ from the alternator 12 at the output of the rectifier 14 and generates a voltage $V_1$ which is proportional to the current $I_1$.

The second current sensor 34 monitors the current $I_2$ drawn by the loads 18a, b and 18c, d at the output of the battery 10 and outputs a voltage $V_2$ which is proportional to the measured current $I_2$. The two voltages $V_1$ and $V_2$ are input to the operational amplifier 37. The amplifier 37 outputs a voltage $V_S=V_1-V_2$ when $V_1$ is greater than $V_2$, $V_S>0$. This generally means that current $I_1$ is greater than $I_2$ which represents a good battery condition since the current drawn by the loads 18a, 18b, 18c, 18d is less than the current supplied to the battery by the alternator 12. When $V_2$ is greater than $V_1$, which means that $I_2$ is greater than $I_1$, the operational amplifier 37 outputs a voltage characterized as a bad battery condition since the current drawn by the loads 18a–18d is greater than the current supplied to the battery 10 by the alternator 12.

FIG. 3B depicts the hysteresis provided by the Schmitt trigger inverter 38. For example, if 100 amps is set as the normal battery operating current and a battery condition tolerance is set to be ±20 amps, then $V_1=0.025I_1$, and $V_2=0.0125I_2$. Therefore, when $I_1 \geq 120$ amps, $I_2=100$ amps, $V_1 \geq 3$ volts and $V_2=1.2$ volts ($V_S=V_1-V_2 \geq 1.8$ volts). Since a $V_S$ of 1.8 volts is the greater than the hysteresis of the inverter 38, the output of the inverter 38 is a logic "0" which is characterized as a good battery condition. On the other hand, when $I_1 \leq 80$ amps, $I_2=100$ amps, $V_1$ is $\leq 2$ volts and $V_2=1.2$ volts. $V_S$ therefore $=V_1-V_2 \leq 0.8$ volts. This is less than the hysteresis of the inverter 38 such that the output of the inverter 38 is a logic "1", which is characterized as a bad battery condition.

The output of the inverter 38 is supplied to a frequency selection circuit 40 which is formed of several major sub-circuits including an oscillator 42, a time base selector circuit 44 and a valve 46 in the form of AND gate 46.

As specifically shown in the example of FIG. 4, the oscillator 42 is, by example only, a 10 MHZ oscillator formed of a 10 MHZ oscillator crystal 48, resistors 50 and 52, capacitors 54 and 56 and an amplifier 58 which operates as a pulse regulator and buffer. The frequency selection circuit generates a 78125 Hz time base by dividing 128 times of the 10 MHZ time base. The output of the amplifier 58 is input through the pulse regulator 60 to the time base selector circuit 44 along with the output of the inverter 38 and a time output from binary counter 62 which also receives the inverted output of the pulse regulator 60.

The time base selector circuit 44 includes an inverter 66 acting as an interlock for one of the two time bases and receives the output of the inverter 38. The inverter 66 has its output connected as one input to OR gate 68. The other input to the OR gate 68 is the time base output from the binary counter 62. The second OR gate 71 has two inputs, one of which is the output of the inverter 38 and the other is the output of the pulse regulator 60. The time base selector circuit 44 acts as a time base selector depending upon the condition of the battery 10.

In bad battery conditions, as described above, the inverter 38 outputs a logical "1" which locks the output of the OR gate 71 high. As a result, the 78125 Hz time base pulses from the output of the counter 62 are supplied to the AND gate 46 through the OR gate 68.

When good battery conditions exist, the inverter 38 outputs a logical "0" which blocks the OR gate 68 via the interlock 66 by maintaining the output of the OR gate 68 high due to the interlock 66. In this situation, the 10 MHZ time base pulses can pass to the input of the AND gate 46 from the pulse regulator 60. Thus, it can be seen that the AND gate 46 acts as a valve which takes time based pulses from either of the two OR gates 71 or 68 at the 10 MHz or 78125 Hz time rates.

The output of the AND gate 46, which is one of the two time base pulse rates described above, is input to a pulse width modulation (PWM) generator 70 which, in the example of FIG. 4, is formed of three subsections including a PWM period timer 72, a PWM duty cycle timer 74 and the switches 20a–20d.

The PWM period timer 72 includes a 12 stage binary counter 80 which receives the output of the AND gate 46 as a clock input signal. The counter 80 counts the time based pulses from the AND gate 46 up to a total count of 1024 and outputs a logical "1". The logical "1" output is supplied to an inverter 82 which inverts the logical "1" output to a logical "0". The output of the inverter 82 is supplied to a "load" input of four pre-settable four bit binary counters 84, 86, 88, and 90. This "load" input signal causes the counters 84, 86, 88 and 90 to go into a "reloading" mode.

The output of the binary counter 80 is also supplied to an AND gate 92 and makes the output of the AND gate 92 transparent to the time based pulses from the AND gate 46 which are supplied as another input to the AND gate 92. At the rising edge(s) of each time base pulse, the pre-settable counters 84, 86, 88 and 90 are reloaded with pre-set duty cycle values on input pins 85, 87, 89 and 91, respectively. The preset values input to the counters 84, 86, 88 and 90 are from an external controller, such as the ECM controller on the vehicle. The duty cycle values generally set an percent duty cycle depending upon the battery voltage, such as a 10% duty cycle at a battery output voltage of 42 volts and a 24% duty cycle when the battery output voltage is 25 volts. The external controller may use a lookup table with pre-stored values or a formula to calculate the percent duty cycle based on the specific battery voltage at any given instance in accordance with conventional duty cycle techniques.

At the fourth next falling edge of the time base pulses, the $Q_3$ output of the counter 80 goes to a logic "1" while the $Q_{10}$ output remains at a logic "1". There two signals, namely, $Q_3$ and $Q_{10}$, through the AND gate 94 make the counter 62 and the counter 80 reset which causes all of the outputs of the counters 62 and 80 to go to logical "0". The logical "0" on the output of the counter 80 blocks time base pulses from passing through the AND gate 92 and releases the four bit counters 84, 86, 88 and 90 from the "reloading the mode" to the "counting" mode via inverter 82. The circuit is now ready for a new PWM cycle.

The PWM duty cycle timer 74 includes the four pre-settable 4 bit binary counters 84, 86, 88 and 90 which have been described above. When the "reloading" procedure has been completed and the "counting" mode started, as also described above, the time base pulses from the AND gate 46 are counted serially from counter 84 to counter 90.

The actual count times are set by the pins 85, 87, 89 and 91 on the counters 84, 86, 88 and 90, respectively, according to the following relationship:

$$M+(N-1)\times16+(R-1)\times256$$

When the preset counting time is reached, the output of the counter 88 goes to a logical "1" state. At the rising edge of the pulse on the output of counter 88 ("0" to "1"), the output of counter 90 goes to a logical "1". The logical "1" at the output of the counter 90 disables the counter 90 from counting via the inverter 99 while turning on the switches 20a–20d, via a FET driver 98 connected to the output of the counter 90. This disabled counter 90 maintains its output at a logical "1" until the "reload" signals are again received from the PWM period timer 72 as described above.

Therefore, the time that the output of the counter 90 is in a logical "1" state is the difference of the PWM period timer cycle (P) and the PWM duty cycle timer counting time (C). This is the duty cycle of the PWM waveform. The following equations are used to calculate the actual time:

$$P=1024\times t:$$

$$T=[M+(N-1)\times16+(R-1)\times256]\times t$$

$$D = \frac{P-C}{P} = \frac{1-C}{P} = 1 - \frac{M+(N-1)\times16+(R-1)\times256}{1024};$$

Where:
P: Period of PWM waveform,
D: Duty cycle of PWM waveform,
C: Presetting time,
M: Preset value on 84,
N: Preset value on 86,
R: Preset value on 88,
t: Period of tiem base pulses.
The resolution of the duty cycle for this example is $$\frac{1}{1024}$$

The output of the duty cycle timer 74 is a PWM waveform in one of two selectable frequencies. Thus, the pulse width modulated signal, via the mosfet driver 98, supplied to the switch 20a–20d, which controls the duty cycle or on-time of each pulse width modulated cycle, is responsive to the battery conditions. When good battery conditions exist, such as where the $I_1$ is greater, for example, than 120% of $I_2$, the higher 10 MHZ frequency is selected as a clock input to the counters 84, 86, 88 and 90. The preset counts 85, 87, and 89 to the counters 84, 86, and 88 respectively, define the duty cycle and are supplied by an external controller. A higher duty cycle can be selected during good battery conditions to thereby to place the lamps in ordinary mode at full brightness.

When bad battery conditions exist, such as where $I_1$ is less than 80% of $I_2$, the lower 78125 Hz time base pulses are selected through the frequency selection circuit 40 and supplied to the pulse width duty cycle counters 84, 86, 88 and 90. A shorter duty cycle can be selected to place the lamps in an energy saving mode to thereby reduce current draw from the battery 10.

Figure 6:
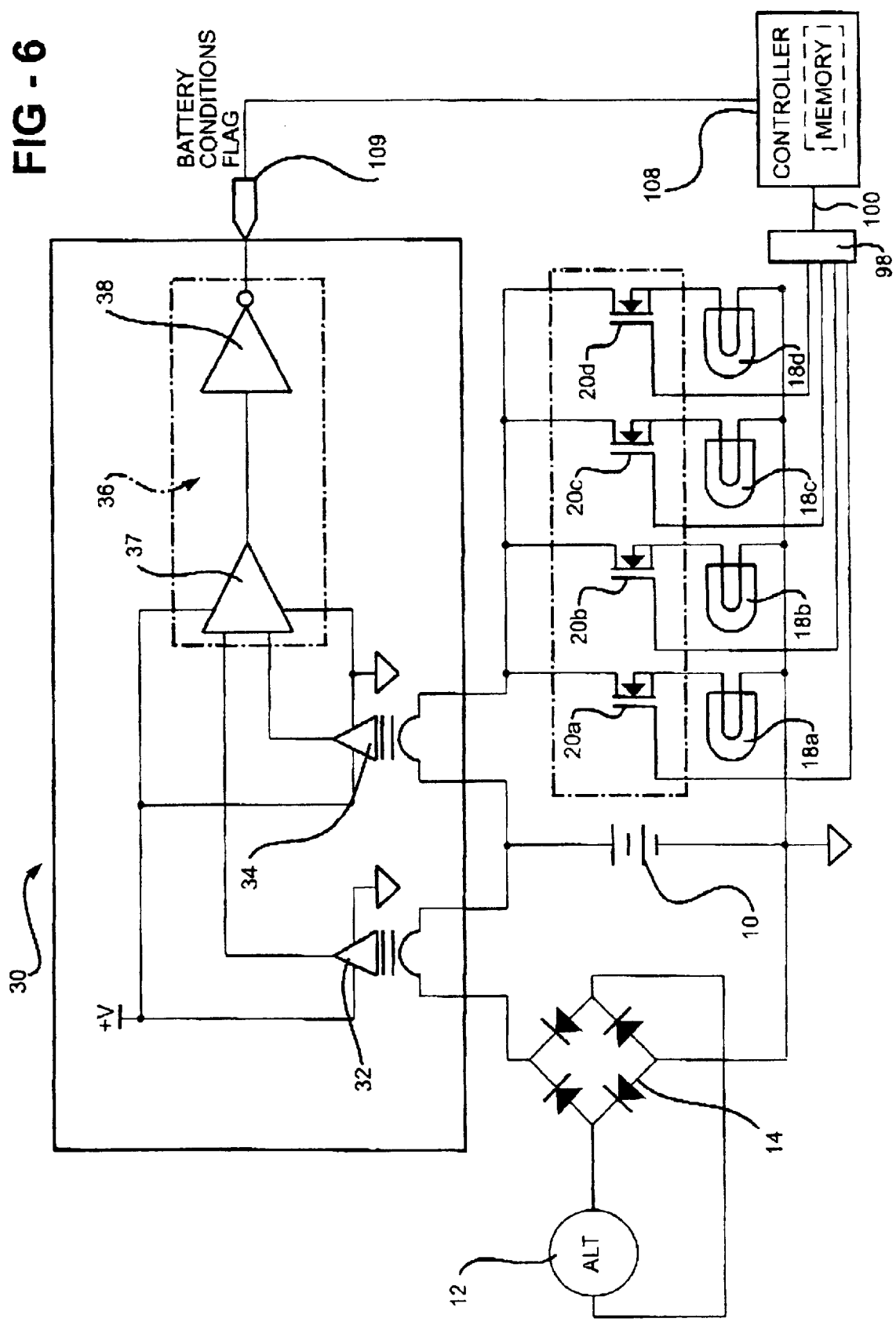
FIG. 6 is a circuit diagram of a battery condition monitoring circuit useable with the software aspect of the invention shown in FIG. 5.

The present adaptive variable frequency lamp power PWM circuit may also be implemented by a controller 108, as shown in FIG. 6 such as a microprocessor having a control program stored in a memory. The controller 108 and memory may be stand-alone elements or part of one of the on-board vehicle controllers which are not shown in FIG. 6.

Figure 5:
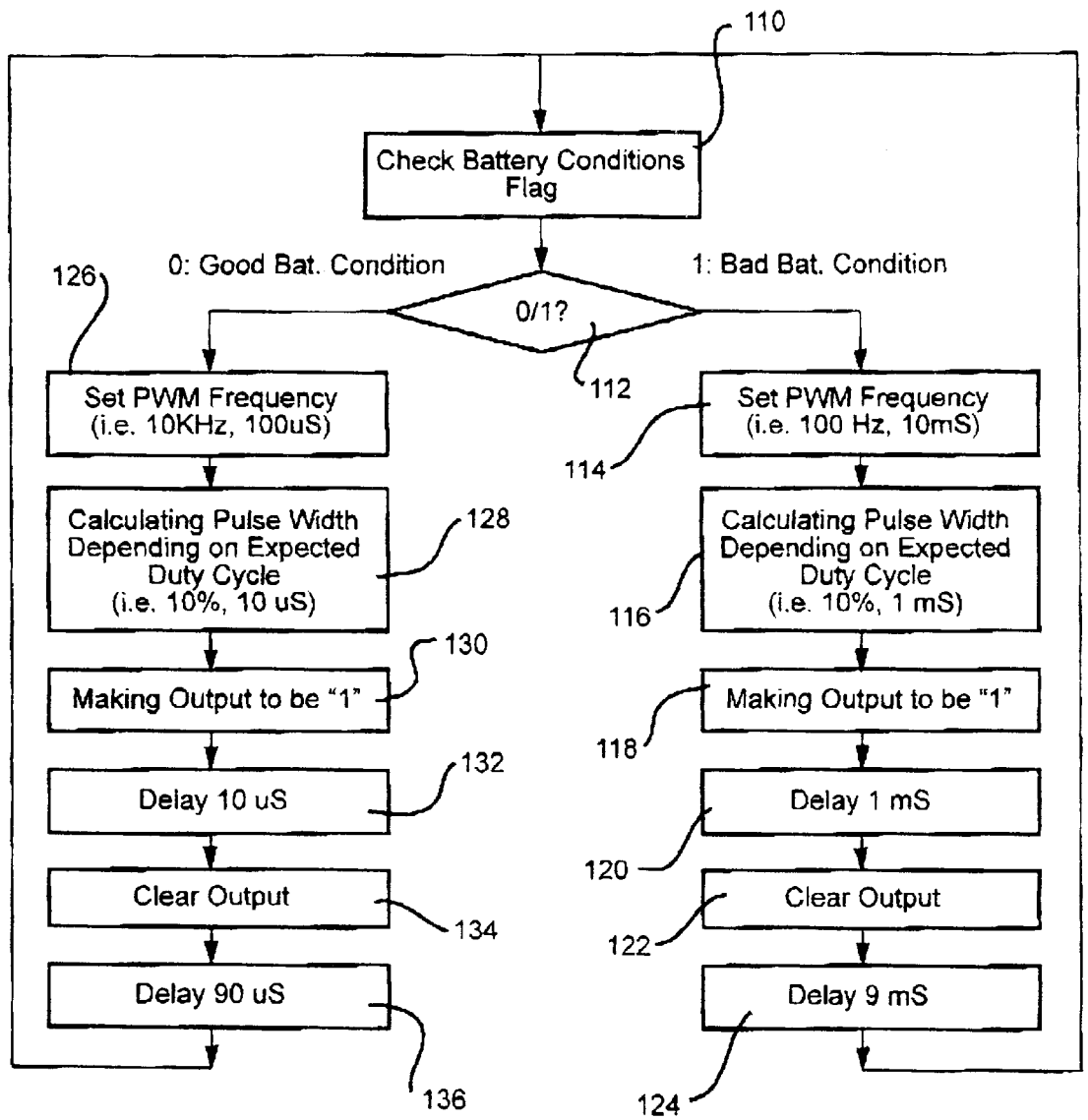
FIG. 5 is a flow diagram depicting a software implemented aspect of the present invention.

The battery condition monitoring circuit shown in FIG. 6 is identical to the monitoring circuit 30 described above and shown in FIG. 4 which, by example, monitors battery input and output currents. Thus, the same reference numbers are used to refer to the same component in both circuits. Further, the operation of the battery condition monitoring circuit shown in FIG. 5 is the same as that described above except for two modifications. First, the gate signal to the switches 20*a*–20*d* or Mosfets is an output signal 100 from the controller 108 via the Mosfet driver 98. In addition, the output of the battery condition monitoring circuit 30 is a signal labeled "battery conditions flag". This signal is input to the controller 108.

Referring now to FIG. 5, there is depicted a flow diagram of a sequence of operation steps in the control program executed by the controller 108 to provide a PWM based, variable frequency, power signal to control the amount of power, or current supplied to the loads 18*a*, 18*b*, 18*c*, and 18*d* depending upon good or bad battery conditions as determined by the battery conditioning monitoring circuit 30.

In step 110, the controller 108 checks the battery conditions flag 109 controlled by the battery conditions monitor circuit 30 and determines in step 112 if the flag is at a logical "0" or a logical "1" state. If the logical "1" state is present, which is indicative of a bad battery condition, the controller 108 selects a low pulse width frequency, such as 100 Hz. The controller 108 then calculates the pulse width depending upon the expected duty cycle, which, by example, can be 10%. This results in a pulse width of 1 millesecond. The controller 108 then makes the signal 100 to the switches 20*a*–20*d* at a logical "1" level at the start of each pulse width via the driver 98. The controller provides a delay of 1 millisecond before clearing the output or signal 100 to a logical "0". The controller 108 then delays an additional 9 milliseconds in step 124 before returning to step 110.

If the controller 108 determines a logical "0" in step 112, which is indicative of a good battery condition, the controller 108 selects the pulse width frequency at a higher frequency rate, such as, for example, 10 KHz, in step 126. This PWM frequency has a period of 100 microseconds.

Next, in step 128, the controller 108 calculates the pulse width depending upon an expected duty cycle, such as 10%. This results in a pulse width of 10 microseconds. The controller 108 then makes the signal 100 a logical "1" in step 130 and delays the calculated pulse width of 10 microseconds in step 132 before clearing the signal 100 in step 134 to a logical "0". The controller 108 then delays an additional 90 microseconds in step 136 for the remainder of the pulse width period before returning to step 110 to repeat the cycle. Usually, during the delays in steps 120, 124, 132 and 134, the controller 108 executed other tasks.

In summary, there has been disclosed a unique variable frequency PWM based load control apparatus which provides different frequency pulse width modulated signals at varyingly selectable duty cycles to a load depending upon the condition of the battery relative to the current drawn by the load. The apparatus enables the loads to be normally operated at their optimum power level and at a high frequency of operation for long life under good battery operating conditions, but at a lower energy saving frequency and a lower duty cycle under bad battery conditions.

What is claimed:

1. Apparatus for controlling the application of DC power to an electrical load in an automotive electrical system including a battery having a higher voltage capacity than is desired for application to the load comprising:

an electrical load;

a pulse width modulation circuit connecting the battery to the load;

means for monitoring a condition of the battery and producing an output signal of a value indicating said condition; and means connecting the output signal to the pulse width modulation circuit to vary the operating frequency thereof according to the value of the output signal.

2. Apparatus as defined in claim 1 wherein the value of the output signal is indicative of either a good or a bad battery condition and the operating frequency which is selected for an indication of a bad battery condition is lower than the operating frequency selected for an indication of a good battery condition.

3. Apparatus as defined in claim 1 further including means for varying the duty cycle of the pulse width modulation circuit.

4. A method of energizing a motor vehicle electrical load using a battery having a higher output potential than is desirable to apply to the load comprising the steps of:

a. supplying electrical power from the battery to a load through a pulse width modulatable switch;

b. operating the switch at a duty cycle which decreases the battery voltage to the desired applied level;

c. monitoring battery condition; and d. varying the frequency of switch modulation based on the monitored battery condition so as to select a lower frequency of pulse width modulation whenever battery condition indicates the need to conserve battery power.

5. A method as defined in claim 4 further comprising the step of varying the duty cycle of the pulse width modulatable switch according to the selected frequency of switch modulation.

* * * * *